(12) United States Patent
Chandalia et al.

(10) Patent No.: US 6,654,522 B2
(45) Date of Patent: Nov. 25, 2003

(54) PROCESS FOR FABRICATING TAPERED MICROSTRUCTURED FIBER SYSTEM AND RESULTANT SYSTEM

(75) Inventors: Juhi Chandalia, Newton Square, PA (US); David John DiGiovanni, Montclair, NJ (US); Benjamin John Eggleton, Summit, NJ (US); Sandra Greenberg Kosinski, Murray Hill, NJ (US); Robert Scott Windeler, Annandale, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/128,622

(22) Filed: Apr. 23, 2002

(65) Prior Publication Data

US 2002/0114574 A1 Aug. 22, 2002

Related U.S. Application Data

(62) Division of application No. 09/692,955, filed on Oct. 20, 2000.

(51) Int. Cl.[7] .............................. G02B 6/26; G02B 6/42
(52) U.S. Cl. ........................ 385/48; 385/125; 264/1.24
(58) Field of Search ................... 385/48, 125; 264/1.24

(56) References Cited

U.S. PATENT DOCUMENTS

| | | | | |
|---|---|---|---|---|
| 4,877,300 A | * | 10/1989 | Newhouse et al. | 385/43 |
| 5,295,210 A | * | 3/1994 | Nolan et al. | 385/43 |
| 5,353,363 A | * | 10/1994 | Keck et al. | 385/15 |
| 5,420,948 A | * | 5/1995 | Byron | 359/573 |
| 5,479,546 A | * | 12/1995 | Dumais et al. | 385/16 |
| RE35,138 E | * | 1/1996 | Weidman | 385/42 |
| 5,809,189 A | * | 9/1998 | Murphy et al. | 385/123 |
| 6,282,342 B1 | * | 8/2001 | Berkey et al. | 385/15 |
| 6,334,017 B1 | * | 12/2001 | West | 385/123 |
| 6,334,019 B1 | * | 12/2001 | Birks et al. | 385/125 |

OTHER PUBLICATIONS

Birks, T.A. et al., "Generation of an ultra–broad supercontinuum in tapered fibres", Conference on Lasers and Electro–Optics, 2000 OSA technical Digest Series (Optics Society of America, Washington, DC 2000) postdeadline paper CPD–30. No Date.*

Fermann, M.E. et al., "Ultrawide tunable Er soliton fiber laser amplified in Yb–doped fiber," Opt. Let. 24, 1428 (1999).*

* cited by examiner

Primary Examiner—Lynn Feild
Assistant Examiner—Hae Moon Hyeon

(57) ABSTRACT

The invention involves providing a microstructured fiber having a core region, a cladding region, and one or more axially oriented elements (e.g., capillary air holes) in the cladding region. A portion of the microstructured fiber is then treated, e.g., by heating and stretching the fiber, such that at least one feature of the fiber microstructure is modified along the propagation direction, e.g., the outer diameter of the fiber gets smaller, the axially oriented elements get smaller, or the axially oriented elements collapse. The treatment is selected to provide a resultant fiber length that exhibits particular properties, e.g., mode contraction leading to soliton generation, or mode expansion. Advantageously, the overall fiber length is designed to readily couple to a standard transmission fiber, i.e., the core sizes at the ends of the length are similar to a standard fiber, which allows efficient coupling of light into the microstructured fiber length.

26 Claims, 3 Drawing Sheets

10 μm

132 μm

PROCESS FOR FABRICATING TAPERED MICROSTRUCTURED FIBER SYSTEM AND RESULTANT SYSTEM

CROSS REFERENCE TO RELATED APPLICATIONS

This application is a divisional of U.S. patent application Ser. No. 09/692,955 filed Oct. 20, 2000 by J. K. Ohandalia et al. and titled *Process For Fabricating Tapered Microstructured Fiber System and Resultant System.*

BACKGROUND OF THE INVENTION

1. Field of the Invention

The invention relates to optical communications systems using microstructured optical fiber.

2. Discussion of the Related Art

Microstructured optical fiber, e.g., fibers containing capillary air holes, are known. Such fibers have experienced renewed interest due to a variety of interesting properties observed, including supercontinuum generation and soliton generation. See, e.g., B. J. Eggleton et al., "Cladding-Mode-Resonances in Air-Silica Microstructure Optical Fibers," *Journal of Lightwave Technology,* Vol. 18, No. 8 (2000); J. C. Knight et al., "Anomalous Dispersion in Photonic Crystal Fiber," *IEEE Photonics Technology Letters,* Vol. 12, No. 7 (2000); J. Ranka et al., "Visible continuum generation in air-silica microstructure optical fibers with anomalous dispersion at 800 nm," *Optics Letters,* Vol. 25, No. 1 (2000); and U.S. Pat. Nos. 5,907,652 and 6,097,870. While these fibers have generated interesting and attractive properties, several practical difficulties exist. For example, many of these unique properties are found in microstructured fiber that have an extremely small core. Coupling light efficiently into such a fiber is thus a significant hurdle. In addition, the robustness of such fibers is sometimes in question. A variety of similar hurdles stand between the current state of the art and commercial feasibility.

Thus, improvements in fabrication and design of systems utilizing microstructured optical fiber, as well a new ways to develop and manipulate the fiber itself, are desired.

SUMMARY OF THE INVENTION

The invention relates to improved techniques for utilizing microstructured optical fibers in a variety of systems, e.g., techniques for manipulating microstructured fiber, forming robust small-diameter microstructured fiber, and/or for manipulating modes propagating through a microstructured fiber. The process is relatively straightforward and also provides for efficient incorporation and operation of the resultant fiber in a communications system.

Stated generally, the invention involves providing a microstructured fiber having a core region, a cladding region, and one or more axially oriented elements (e.g., capillary air holes) in the cladding region. A portion of the microstructured fiber is then treated, e.g., by heating and stretching the fiber, such that at least one feature of the fiber microstructure is modified along the propagation direction, e.g., the outer diameter of the fiber gets smaller, the cross-section of the axially oriented elements get smaller, or the axially oriented elements collapse. The treatment is selected to provide a resultant fiber length that exhibits particular properties such as mode contraction (optionally leading to soliton generation) or mode expansion. Advantageously, the process is performed such that the resultant fiber length is able to readily be coupled to a standard transmission fiber, i.e., the core sizes are similar, which allows efficient coupling of light. (Modified along the propagation direction indicates that as one moves along the propagation direction, one or more aspects of the microstructure vary. Outer diameter indicates the diameter of the outermost cladding, not including any protective coating. Fiber length, as used herein, indicates the entire structure, i.e., untreated and treated fiber sections.) Fiber lengths fabricated according to the invention are useful for a variety of applications, including dispersion management, optical regeneration, reshaping, and retiming, providing nonlinear effects such as soliton generation, soliton self-frequency shift, and pulse compression, and providing efficient coupling into laser diodes and similar devices.

In one embodiment, reflected in FIGS. 1A and 1B, the treated portion of the fiber 10 is heated and stretched to form at least one tapered region 22, 23 and a waist region 24, the tapered region(s) leading from an untreated portion of the fiber to the waist region. Typically, the microstructure of the fiber is maintained in the at least one tapered region, and in at least a portion of the waist region. In fact, one way to readily fabricate sections of small-core microstructured fiber of the type discussed above is to stretch a larger profile microstructured fiber. And, moreover, because a portion of the fiber retains its original core diameter, light from an adjacent transmission fiber is capable of being efficiently coupled into the microstructured fiber length. The resultant structure is, for example, capable of highly advantageous soliton self-frequency shift, discussed in more detail below. (Maintenance of the microstructure in the tapered region and/or the waist region, as used herein, indicates that the presence and arrangement of at least a portion of the axially oriented elements are maintained, although likely in a different size and proportion than in the initial fiber; it is possible that a doped core present in the initial fiber will essentially disappear in the waist region, but such an effect does not indicate that the microstructure has not been maintained.)

Significantly, the above embodiment is typically performed such that light propagating through the waist region fiber is confined by the axially oriented elements, e.g., by the capillary air holes. Confined, as used herein, indicates confinement due to the effective refractive index profile provided by the combination of the silica and the axially oriented elements, or due to a bandgap effect provided by periodically disposed axially oriented elements. In this respect, the invention constitutes a significant improvement over prior art systems that used tapering techniques. For example, in T. A. Birks et al., "Generation of an ultra-broad supercontinuum in tapered fibres," *CLEO '00,* postdeadline paper CPD30 (2000), the authors report tapering a conventional optical fiber, i.e., a non-microstructured fiber, down to a waist region having a diameter less than 2 $\mu$m. At this small diameter, the core essentially disappears, and the entire fiber diameter then constitutes a core region with the cladding provided by the surrounding air. While unique properties of the type discussed above were exhibited by the stretched fiber, the fact that the surrounding air provides the cladding renders the design commercially unfeasible. Specifically, not only does the waist region becomes highly sensitive to bending—i.e., bends introduce loss, but a polymer re-coat of the waist region modifies the air-silica boundary and thereby similarly introduces loss. Thus, the system described by Birks et al. is not robust enough for feasible commercial use.

In contrast, according to the above embodiment of the invention, the axially oriented elements present in the waist region fiber confine propagating light therein, i.e., provide an effective cladding. Because the outside of the fiber is therefore not functioning as the cladding, the resultant waist region is highly robust. Specifically, since the exterior air is not used as cladding, a larger diameter can be provided, i.e., there can be additional silica surrounding the axially oriented elements, which improves the robustness of the waist region. Moreover, also in contrast to the Birks et al. fiber, the fiber of the invention is able to endure bending as well as a polymer re-coat, further increasing the ease with which the overall fiber length is able to be incorporated into a system.

In another embodiment of the invention, reflected in FIG. 2, the microstructure of the initial fiber is treated such that axially oriented elements (typically capillary air holes) are partially or fully collapsed in at least part of the treated portion of the fiber, while the overall diameter of the treated section remains about the same as the untreated section (e.g., the diameter of the treated portion is generally at least 90% of its original diameter). (Partial collapse indicates a reduction in cross-section of the elements, but with the elements still intact.) This gradual collapse as one moves along the propagation direction is able to provide mode expansion, i.e., the effective refractive index profile provided by the presence of the axially oriented elements disappears, leaving a silica cladding in its place. Such mode expansion is useful, for example, in a variety of applications were conversion into a larger mode is desired, e.g., to minimize coupling losses between a fiber and another element such as a larger area detector or a laser diode (see, e.g., W. T. Chen and L. A. Wang, "Laser-to-fiber coupling scheme by utilizing a lensed fiber integrated with a long-period grating," *IEEE Photonics Tech. Lett.*, Vol. 12, No. 5, 501–503 (2000)). Such gradual collapse is also possible in combination with some stretching. For example, it is possible to take a microstructured fiber, collapse the air holes at one end, which enhances splicing and coupling to standard transmission fiber, and stretch another portion of the fiber to provide desired properties.

DETAILED DESCRIPTION OF THE INVENTION

Figure 1A:
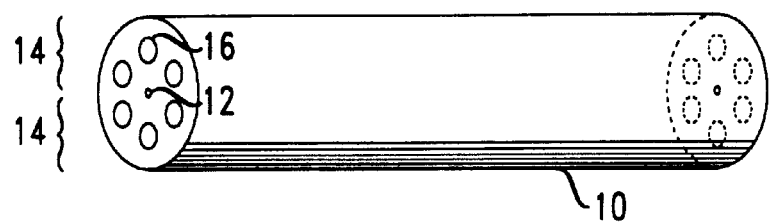
FIGS. 1A–1C reflect an embodiment of the invention.
Figure 1B:
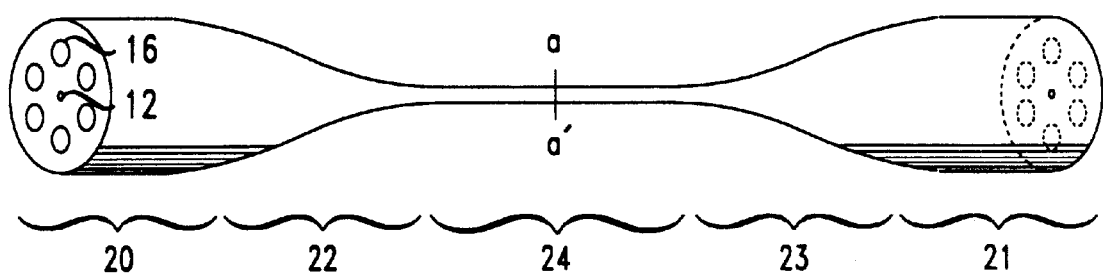
Figure 1C:
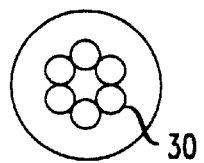

One embodiment of the invention is illustrated in FIGS. 1A–1C. A microstructured optical fiber 10 is provided. The fiber 10 comprises a core region (e.g., a germanium-doped core 12), a cladding region 14, and axially oriented elements located in the cladding region—in this embodiment six capillary air holes 16. (It will be apparent that the number of air holes are capable of being widely varied depending on the particular application for the fiber.) For such a fiber having core and outer diameters of a typical communications fiber, e.g., core diameter of about 10 $\mu$m and outer diameter of about 125 $\mu$m, the capillary air holes 16 will generally play substantially no role in waveguiding—they are sufficiently removed from the central region to substantially avoid influencing the fundamental mode, and will only play a role in the treated region, as discussed below. (In other embodiments, it is possible for the axially oriented elements to contribute to waveguiding in the initial fiber.)

The microstructured fiber is fabricated by any suitable method. For example, it is possible to form the core and inner cladding by a conventional technique such as Modified Chemical Vapor Deposition (MCVD). In such a case, the core glass, optionally doped with a material such as germanium, is deposited on the inside of an inner cladding tube, and the tube is then collapsed into a solid core rod. The preform is then typically completed by providing appropriate structural members on the periphery of the rod, e.g., capillary tubes, which are generally attached by melting or physical bundling, followed by overcladding of the resultant structure. The assembly is then generally consolidated into a preform, and the preform is ready to be placed into a draw tower, where fiber is drawn according to conventional techniques.

It is also possible to fabricate the microstructured optical fiber by a sol-gel technique, such as discussed in co-assigned U.S. patent application Ser. No. 09/613320, filed Jul. 11, 2000 (our reference De Hazan 1–82–7–6–10). Described generally, this technique involves providing a vessel (typically tube shaped), with elongate elements (e.g., wires, needles, or fibers) extending at least a portion of the length of the vessel and provided in a predetermined spatial arrangement. The vessel is at least partially filled with a silica-containing sol, and the sol is gelled, such that a gel body with the elongate elements embedded therein is formed. Then the gel body is separated from the elongate elements (typically with the aid of a release agent), dried, purified, and sintered, and then the microstructured optical fiber is drawn from the sintered gel body. A suitable sol-gel technique is reflected, for example, in co-assigned U.S. Pat. No. 5,240,488. Typically, the elongate elements are maintained in the desired spatial arrangement by holding fixtures, e.g., a bottom and a top end cap with appropriately located holes and recesses. The vessel typically is a tubular vessel, with the bottom opening of the vessel closed off by a removable cap or other appropriate closing means. The top holding fixture typically is axially movable to facilitate removal of the elongate elements from the gel body. It is also possible for the elongate elements to be physically, chemically or thermally removable, e.g., polymer rods or fibers, such that the elements are capable of being moved after gelation by, e.g., pyrolysis or chemical action.

According to this first embodiment, once the microstructured optical fiber is provided, the fiber is placed into an apparatus that heats a portion of the fiber, generally by exposure to a flame, and stretches the heated portion. For example, the taper typically reduces the diameter of the inner cladding region of initial fiber by at least a factor of 2. (The inner cladding region is the region which predominantly confines propagating modes.) A variety of apparatus suitable for such heating are known to those skilled in the art. The flame temperature is selected such that the fiber is soft enough to stretch without breaking, but not so soft that the capillary air holes collapse. As shown in FIG. 1B, the stretching results in untreated fiber regions 20, 21, two taper regions 22, 23, and a waist region 24, with the microstructure maintained through the taper regions 22, 23 and throughout the waist region 24. Maintenance of the microstructure in the waist region 24 is shown in FIG. 1C, which is a representation of waist region cross-section at a–a'. FIG. 1C shows the existence of capillary air holes 30, which are the stretched portions of the original capillary air holes 16 (and have a smaller diameter than the original air holes 16).

The germanium-doped core 12 present in the initial fiber essentially disappears upon stretching, i.e., light in the typical communications window does not "see" a germanium-doped core when propagating through the waist region.

The capillary air holes 30 present in the taper and in the waist region confine propagating light therein, i.e., the air holes 30 provide an effective cladding layer. Thus, the core of the waist region is made up of a central silica region, with the cladding provided by an effective refractive index contrast provided by the presence of the air holes. The fiber length (i.e., treated and untreated fiber) thus provides mode contraction due to the tapering into the smaller waist region. Effects of such mode contraction are presented in Example 1 below. In addition, the taper is optionally designed to be adiabatic, i.e., where the taper does not induce coupling between modes. Thus, a fundamental mode propagating through the untreated fiber evolves into a fundamental mode in the taper and in the waist region. The ability to design an adiabatic taper is presented in Example 1 below.

Such mode contraction makes it possible, for example, to generate soliton self-frequency shifts tunable over nearly the entire communication window of interest. In particular, optical soliton pulses generally experience a continuous downshift of the carrier frequencies when propagating in a fiber with anomalous group-velocity dispersion. This soliton self-frequency shift originates from intra-pulse stimulated Raman scattering, which transfers the high frequency portion of the pulse spectrum toward the low frequency portion. (See, e.g., F. M. Mitschke and L. F. Mollenauer, "Discovery of the soliton self-frequency shift," *Opt. Lett.*, Vol. 11, 659 (1986); J. P. Gordon, "Theory of the soliton self-frequency shift," *Opt. Lett.*, Vol. 11, 662 (1986).) While soliton self-frequency shift has attracted some attention, use of conventional fibers for generating such solitons has significant limitations. For example, due to the requirement of anomalous dispersion, the tuning range of solitons is limited by a fiber's zero dispersion wavelength. Also, conventional fibers exhibit higher-order group-velocity dispersion, which causes soliton decay or pulse breakup, and thereby severely limits the available tuning range for frequency-shifting solitons.

The invention, however, is able to provide stable, frequency-shifting solitons tunable over a relatively wide range of wavelengths, e.g., 1.3 to 1.65 $\mu$m, as reflected in Example 1. For example, the invention makes it possible to generate soliton self-frequency shifts over this range of 1.3 to 1.65 $\mu$m, with about 100 fs soliton pulses at input pulse energies of about 1 to about 3 nJ. Conversion efficiency is typically greater than 60%, optionally greater than 80%. And, as opposed to using a relatively long length, e.g., 50 m of conventional fiber, the invention is able to do so with less than 15 cm of waist region. A key to this achievement is that the process of the invention makes possible a treated fiber region that provides relatively flat (and strong) dispersion which leads to generation of a stable soliton.

Figure 2:
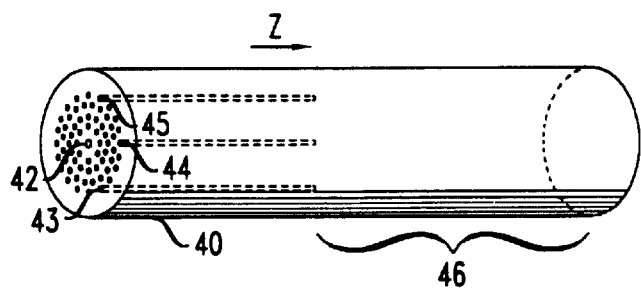
FIG. 2 reflects a further embodiment of the invention.

In another embodiment of the invention, reflected in FIG. 2, a microstructured fiber 40 having axially oriented elements is provided, e.g., having a germanium-doped core 42 and a cladding region containing numerous capillary air holes, e.g., 43, 44, 45 . . . As shown in FIG. 2, the initial fiber is treated such that the capillary air holes, e.g., 43, 44, 45 (typically, but not necessarily all of them) are collapsed in the treated portion 46 of the fiber, optionally while the outer diameter of the treated portion 46 remains about the same as the untreated section (e.g., the outer diameter of the treated portion is at least 90% of the outer diameter of the untreated fiber). Similarly, the germanium-doped core 42 remains in the treated region. (For clarity, only the air holes 43, 44, 45 are shown in the interior of the fiber 40.) Generally, the collapse is provided by heating the treated portion to a temperature that induces collapse, but does not otherwise substantially affect the fiber. (Optionally, in this embodiment, the hole collapse is capable of being combined with some stretching or other manipulation in some or all of the treated region, to attained desired structure/properties.)

This gradual collapse as one moves along the propagation direction is able to provide mode expansion. Specifically, light propagating through the untreated portion of the fiber is guided by the germanium-doped core 42 and confined by the capillary air holes 43, 44, 45 . . . , i.e., by the effective refractive index profile provided by the air holes. If the capillary air holes 43, 44, 45 . . . collapse adiabatically, the mode of the propagating light continues to be guided by the germanium-doped core 42, but is now confined by a cladding or solid silica, which results in expansion of the mode of the propagating light.

A variety of suitable fiber microstructures, including a variety of configurations for the axially oriented elements, are possible, and are known in the art. Capillary air holes, of a variety of shapes and configurations, are generally useful. Axially oriented elements containing other materials are also possible. Selection of an appropriate microstructure is within the ability of one skilled in the art, following the guidelines herein.

An example of such an additional fiber is microstructured fiber in which the axially oriented elements are arranged periodically, to provide a bandgap effect. Such fibers are known in the art as photonic bandgap fibers or photonic crystal fiber. (See, e.g., J. C. Knight et al., "Photonic bandgap guidance in optical fiber," *Science*, Vol. 282, 1476 (1998).) It would be possible according to the invention, for example, to provide a taper in such a periodically structured fiber, such that the taper would adjust the spacing of the axially oriented elements and thereby change the bandgap frequency of the fiber. Other modifications of such periodically structured fiber are also possible.

Another possible microstructured fiber capable of being treated according to the invention contain dopants, e.g., rare earths, in a portion or the entirety of the fiber length, to provide active devices. For example, it is possible to dope a treated region, e.g., with a rare earth such as Yb or Pr, to provide fiber lasers at desired wavelengths. Doping to enhance optical nonlinearity is also possible. Such nonlinearities are also possible by use of fiber formed from nonlinear material, such as chalcogenide and other non-silica materials. Other uses of doped or non-silica fibers according to the invention will be apparent to one skilled in the art.

A variety of modifications and combinations involving heating and stretching a microstructured fiber are also possible. For example, it is possible to have only one taper region, and/or to have the air holes collapse somewhere in the taper region or regions, or somewhere in the waist region. One possible combination of tapering and collapse increases the ease with which a microstructured fiber is coupled to standard single mode fiber. For example, it is possible to take a microstructured (with capillary air holes) fiber having an outer diameter of about 200 $\mu$m, stretch one end down to a smaller diameter to provide desired nonlinearities, and heat the opposite end to collapse the air holes (with some accompanying reduction in the outer diameter). The end with the collapsed holes thereby becomes solid material, which is much easier to splice and to couple to standard transmission fiber. And the stretched end is capable of providing the unique properties discussed herein. Other combinations of techniques are also possible. It is also possible to treat a fiber during draw, and the term treating, as used herein, is intended to include adjustments to, e.g., heating and/or tension, during draw.

The invention will be further clarified by the following example, which is intended to be exemplary.

EXAMPLE 1

Figure 3A:
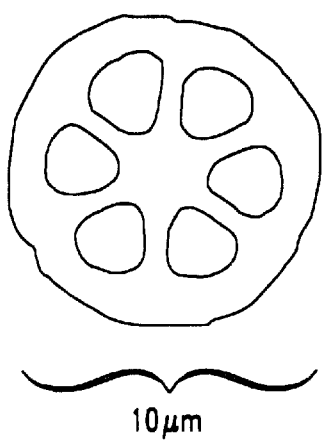
FIGS. 3A and 3B illustrate the characteristics of a fiber length made according to the embodiment reflected in FIGS. 1A–1C.
Figure 3B:
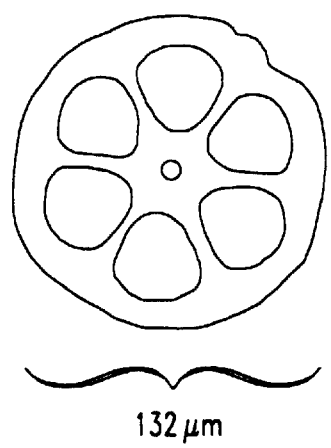

A microstructured fiber was obtained, having a 8 μm germanium-doped silica core, a inner cladding region diameter of about 40 μm, an outer diameter of 132 μm, and a ring of six capillary air holes located circumferentially in the cladding region. FIG. 3B is a representation of the size and configuration of the initial fiber. The fiber was formed by taking an initial preform containing a germanium core, bundling six tubes around the initial preform, overcladding the bundle with a silica tube, consolidating the resultant assembly into a preform, and drawing fiber from the preform. The fiber was placed into a fiber stretching apparatus, heated with a flame to about 1400–1500° C. (near its melting point) and stretched. The fiber was stretched to provide a waist region having a central silica region of about 2.5 μm (with the germanium core essentially disappearing due to the stretching) surrounded by the air holes, an outer diameter of 10 μm, and a length of about 10 to 20 cm, with two tapers at either end of the waist, the tapers having a length of about 0.60 cm. (The overall fiber length resembled the length shown in FIG. 1B.) The microstructure of the initial fiber was maintained in the tapers and throughout the waist region, i.e., the capillary air holes did not collapse. FIG. 3A is a representation of the size and configuration of the fiber in the waist region.

The adiabatic nature of the taper was examined using the Beam Propagation method (see B. J. Eggleton et al., "Cladding-mode-resonances in air-silica microstructure optical fibers," *Journal of Lightwave Technology*, Vol. 18, 1084–1100 (2000)), which examines a launch through a fiber by solving Maxwell's equations at small steps along the propagation direction. For the 132 μlm outer diameter fiber tapered down to a 10 μm outer diameter fiber over a length of 0.60 cm, the adiabacity of the taper was confirmed.

Figure 4A:
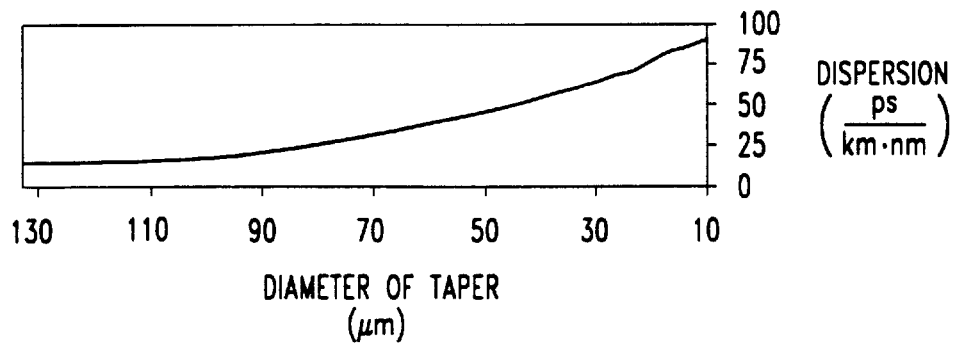
FIGS. 4A and 4B illustrate properties of the fiber length represented in FIGS. 3A and 3B.
Figure 4B:
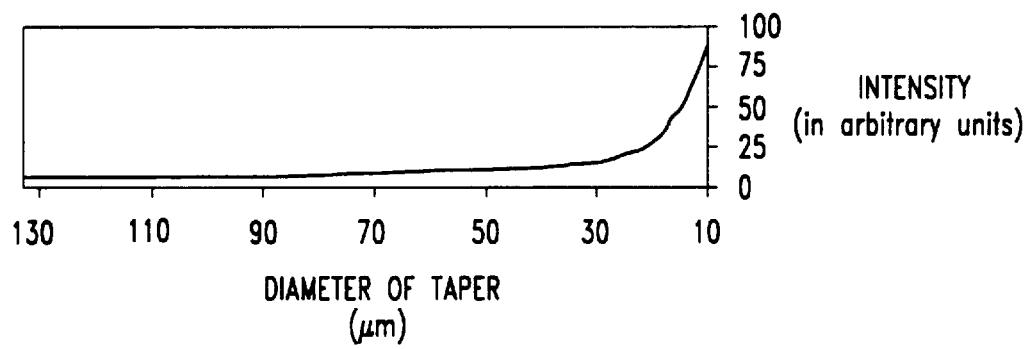

In addition, the effect of decreasing the mode size from the initial microstructured fiber down to the waist region fiber was examined, using beam propagation methods (BPM). FIG. 4A shows the dispersion as a function of the diameter of the taper, and FIG. 4B shows the intensity as a function of the diameter of the taper. The dispersion is initially similar to that of standard fiber, but as the mode becomes confined within the air holes, the waveguide dispersion becomes more significant. As for intensity, because the taper has relatively low loss, the decrease in mode diameter (from 10 (Am to <3u,m) is accompanied by an approximately 16-fold increase in intensity.

The fact that the light propagating in this taper was confined within the capillary air holes was confirmed by surrounding the taper (and waist) with an index matching fluid, and measuring any power loss in the system. The power loss from the taper and waist was less than 0.15 dB.

Figure 5:
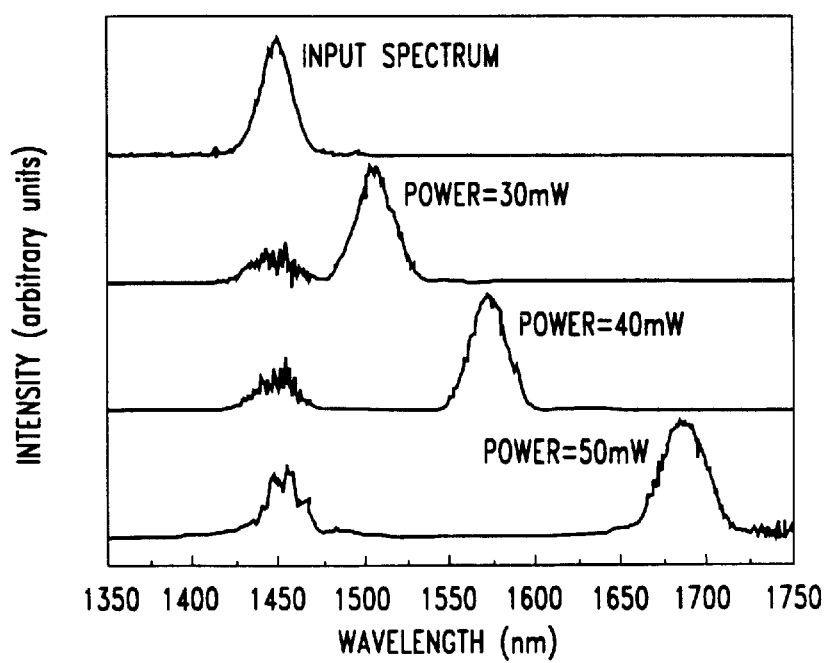
FIG. 5 illustrates further properties of the fiber length represented in FIGS. 3A and 3B.

Nonlinear effects of the fiber length were examined. 1.3 μm laser pulses generated by a femtosecond Ti-sapphire pumped optical parametric oscillator were free-space coupled into the untreated portion of the fiber and propagated through the taper into the waist. The output spectra from the waist, measured at different incident peak powers, is shown in FIG. 5. As can be seen, tunable self-frequency shifting solitons were generated over the communications windows from 1.3 μm to 1.65 μm. In particular, as the light propagated through the length of fiber, the light was continually shifted towards the red due to intrapulse Raman scattering, which transfers the energy of the high frequency part of the pulse spectrum to the low frequency part. It was observed that 80 to 90% of the input power was self-frequency shifted.

Because the treated fiber length exhibited a widely-flattened dispersion curve, it is apparent that the soliton wavelength is capable of being tuned over a wide spectral range by adjusting the input power, and is also stable against instability at high peak intensities. Moreover, soliton-effect pulse compression was exhibited by the treated fiber length—400 fs pulses at 1.55 um were efficiently compressed by a factor of 5 to 80 fs, as reflected in FIG. 5.

Other embodiments of the invention will be apparent to those skilled in the art from consideration of the specification and practice of the invention disclosed herein.

What is claimed is:

1. A process for forming an article, comprising the steps of:

providing a microstructured optical fiber comprising a core region of doped glass, a cladding region of glass peripherally surrounding the core comprising capillary air holes, and one more axially oriented elements located in the cladding region; and treating a portion of the fiber by heating and optionally stretching, wherein the treatment is performed such that at least one feature of the microstructure of the fiber is modified along the propagation direction.

2. The process of claim 1, wherein the at least one feature is selected from the group consisting of fiber outer diameter and cross-section of the axially oriented elements.

3. The process of claim 1, wherein the axially oriented elements are capillary air holes.

4. The process of claim 3, wherein the capillary air holes are located circumferentially around the core region.

5. The process of claim 1, wherein the treatment step comprises stretching.

6. The process of claim 5, wherein the stretching provides the treated portion with at least one tapered region and a waist region, the at least one tapered region leading from an untreated portion of the fiber to the waist region.

7. The process of claim 6, wherein the microstructure of the fiber is maintained in the at least one tapered region, and wherein the microstructure of the fiber and of the at least one tapered region is maintained in at least a portion of the waist region.

8. The process of claim 7, wherein light propagating through the fiber in at least part of the at least one tapered region and in the waist region is confined by the one or more axially oriented elements.

9. The process of claim 7, wherein the at least one tapered region is adiabatically tapered, such that a fundamental mode propagating through the unstretched fiber will evolve into a fundamental mode inside the waist region.

10. The process of claim 7, wherein the microstructure of the fiber is maintained throughout the waist region.

11. The process of claim 6, wherein the tapered region provides a decrease in diameter of an inner cladding region from the untreated fiber to the waist region of at least a factor of 2.

12. The process of claim 1, wherein the axially oriented elements are periodically spaced in the cladding region.

13. The process of claim 3, wherein the treating step partially or fully collapses one or more of the capillary air holes in at least a part of the treated portion.

14. The process of claim 13, wherein the treating step fully collapses one or more of the capillary air holes in at least a part of the treated portion.

15. The process of claim 13, wherein all the capillary air holes are partially or fully collapsed in at least a part of the treated portion.

16. The process of claim 13, wherein the outer diameter of the treated portion is at least 90% of the outer diameter of the untreated portion.

17. The process of claim 13, wherein light propagating from the untreated portion of the fiber to the treated portion experiences mode expansion.

18. The process of claim 6, wherein the provided microstructured fiber comprises a germanium-doped core.

19. The process of claim 13, wherein the provided microstructured fiber comprises a germanium-doped core.

20. The process of claim 1, wherein the treated portion of the fiber is capable of inducing generation of self-frequency shifting solitons over a wavelength range of about 1.3 to about 1.6 $\mu$m.

21. The process of claim 20, wherein the solitons are about 100 fs pulses at input pulse energies of about 1 to about 3 nJ.

22. The process of claim 20, wherein the self-frequency shifting occurs at a conversion efficiency of at least 60%.

23. The process of claim 20, wherein the length of the treated portion of the fiber over which the self-frequency shifting occurs is less than 15 cm.

24. The process of claim 1, wherein the treated portion of the fiber comprises one or more dopants.

25. The process of claim 1 wherein the fiber comprises one or more materials that induce or enhance optical non-linearity in the fiber length.

26. A process for forming an article, comprising the steps of:
- providing a microstructured optical fiber comprising a core region, a cladding region, and one or more axially oriented elements located in the cladding region, wherein the axially oriented elements are capillary air holes; and
- treating a portion of the fiber by heating and optionally stretching,
- wherein the treatment is performed such that at least one feature of the microstructure of the fiber is modified along the propagation direction, and the treating step partially or fully collapses one or more of the capillary air holes in at least a part of the treated portion, and the collapse is induced by heat in the absence of stretching.

* * * * *